(12) United States Patent
Wu et al.

(10) Patent No.: US 10,928,200 B1
(45) Date of Patent: Feb. 23, 2021

(54) FREQUENCY PULLING REDUCTION IN SBS LASER

(71) Applicant: Honeywell International Inc., Morris Plains, NJ (US)

(72) Inventors: Jianfeng Wu, Tucson, AZ (US); Matthew Wade Puckett, Phoenix, AZ (US); Karl D. Nelson, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/665,939

(22) Filed: Oct. 28, 2019

(51) Int. Cl.
| G01C 19/66 | (2006.01) |
| G01C 19/68 | (2006.01) |
| H01S 3/11 | (2006.01) |
| H01S 3/30 | (2006.01) |
| H01S 3/102 | (2006.01) |

(52) U.S. Cl.
CPC ........... *G01C 19/661* (2013.01); *G01C 19/68* (2013.01); *H01S 3/1106* (2013.01); *H01S 3/1022* (2013.01); *H01S 3/302* (2013.01)

(58) Field of Classification Search
CPC ..... G01C 19/661; G01C 19/68; H01S 3/1106; H01S 3/302; H01S 3/1022
See application file for complete search history.

(56) References Cited

U.S. PATENT DOCUMENTS 5,623,336 A * 4/1997 Raab ..................... G01J 3/4412
356/73.1
7,272,160 B1 * 9/2007 Geng ....................... H01S 3/302
372/29.011
10,288,429 B2 5/2019 Qiu et al.

OTHER PUBLICATIONS

Callahan et al., "Frequency-Independent Phase Noise in a Dual-Wavelength Brillouin Fiber Laser", IEEE Journal of Quantum Electronics, Aug. 2011, pp. 1142-1150, vol. 47, No. 8, IEEE.
Debut et al., "Linewidth narrowing in Brillouin lasers: Theoretical Analysis", Physical Review A, 2000, pp. 1-4, vol. 62, 023803, The American Physical Society.
Gross et al., "Tunable millimeter-wave frequency synthesis up to 100 GHz by dual-wavelength Brillouin fiber laser", Optics Express, Jun. 21, 2010, pp. 1-10, vol. 18, No. 13, Optical Society of America.
(Continued)

*Primary Examiner* — Jonathan M Hansen
(74) *Attorney, Agent, or Firm* — Fogg & Powers LLC (57) ABSTRACT

A SBS laser system comprises at least one pump laser that emits a pump beam, and an intensity modulator in communication with the pump laser. The intensity modulator modulates an intensity of the pump beam and transmits an intensity modulated beam. A resonator, in communication with the intensity modulator, is configured to receive the intensity modulated beam such that it travels in a first direction. When optical frequency of the intensity modulated beam matches resonance frequency of the resonator, a power density increases such that beyond a certain threshold power, the intensity modulated beam produces lasing of a first order Brillouin wave including a SBS wave having a SBS gain peak. The SBS wave travels in an opposite second direction in the resonator. A control unit eliminates or reduces the intensity modulation of the beam by minimizing the frequency gap between the SBS gain peak and an SBS resonance peak.

20 Claims, 5 Drawing Sheets

(56) References Cited

OTHER PUBLICATIONS

Nicati et al., "Frequency Pulling in a Brillouin Fiber Ring Laser", IEEE Photonics Technology Letters, Jul. 1994, pp. 801-803, vol. 6, No. 7, IEEE.

Nicati et al., "Frequency Stability of a Brillouin Fiber Ring Laser", Journal of Lightwave Technology, Jul. 1995, pp. 1445-1451, vol. 13, No. 7, IEEE.

* cited by examiner

FREQUENCY PULLING REDUCTION IN SBS LASER

STATEMENT REGARDING FEDERALLY SPONSORED RESEARCH OR DEVELOPMENT

This invention was made with Government support under Contract Number N66001-16-C-4017 awarded by SPAWAR Systems Center Pacific. The Government has certain rights in the invention.

BACKGROUND

Stimulated Brillouin scattering (SBS) laser gyroscopes provide a promising next generation technology due to their simplicity and potential for miniaturization. This technology has been shown to have navigation grade Angle Random Walk (ARW) performance in a short fiber coil. However, gyroscope performance has been limited by bias drift due to frequency pulling, which is also called gain pulling.

Gain pulling is caused by the difference between the SBS gain peak and cavity resonance. In the SBS laser, the SBS gain peak is determined by the pump frequency and its Brillouin shift. The bias drift due to gain pulling is a main bias contributor in SBS lasers.

Thus, there is a need to eliminate or reduce the gain pulling frequency gap between the SBS gain peak and the resonance peak in SBS lasers.

SUMMARY

A stimulated Brillouin scattering (SBS) laser system comprises at least one pump laser device operative to emit a pump light beam at a first pump frequency along an optical pathway. An intensity modulator is in optical communication with the at least one pump laser device along the optical pathway. The intensity modulator is operative to modulate an intensity of the pump light beam and transmit an intensity modulated pump beam. An optical resonator is in optical communication with the intensity modulator. The optical resonator is configured to receive the intensity modulated pump beam such that the intensity modulated pump beam travels in a first direction in the optical resonator. When an optical frequency of the intensity modulated pump beam matches a resonance frequency of the optical resonator, an optical power density within the optical resonator increases such that beyond a certain threshold power, the intensity modulated pump beam produces lasing of a first order Brillouin wave including a SBS wave having a SBS gain peak. The SBS wave travels in an opposite second direction in the optical resonator. A control unit is in optical communication with the optical resonator. The control unit is configured to receive an output signal corresponding to the transmitted intensity modulated pump beam. The control unit is operative to eliminate or reduce the intensity modulation of the pump beam by minimizing the frequency gap between the SBS gain peak and an SBS resonance peak.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods for frequency or gain pulling reduction in stimulated Brillouin scattering (SBS) lasers is described herein. The systems and methods are operative to adjust a pump frequency location to change the pump gain peak and to eliminate the frequency gap between an SBS gain peak and a resonance peak.

In one exemplary approach, a frequency modulation (FM) is applied to a pump laser beam at a given frequency. The FM generates a series of sidebands in the frequency domain. The opposite odd number sidebands are out of phase with each other. When a carrier power reaches its threshold, it starts to generate SBS (carrier) in the opposite direction. Meanwhile, the sidebands generate their own SBS (+/− sideband) as well. If the FM amplitude is very small, there are only +/−first side bands significant enough to generate their own SBS. Both sideband SBS beat with the carrier SBS and generate RF frequency at about the FM. Because the two pump side bands (+/−) are out of phase with each other, the overall RF beat signal at FM is the difference between two beat signals.

When the SBS gain peak generated by the pump carrier does not overlap with a cavity resonance peak, the +/−SBS sideband experience different gain and have different amplitude. Therefore, the two beat signals will not cancel each other. When the gain peak overlaps with the cavity resonance peak, both side bands experience the same gain due to the nature of the Lorentzian gain profile. Therefore, two beat signals have the same amplitude but opposite phase. By using the amplitude of RF signal at FM as the error signal, the present method can actively align the gain peak with the cavity resonance peak.

Further details of various embodiments are described hereafter with reference to the drawings.

Figure 1:
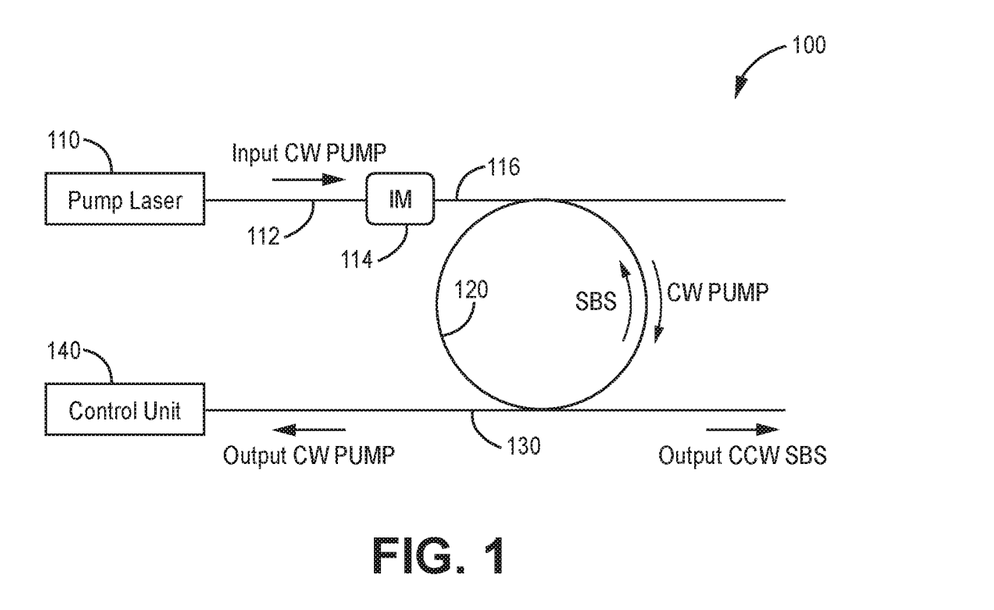
FIG. 1 is a schematic illustration of a stimulated Brillouin scattering (SBS) laser system 100, according to one embodiment.

FIG. 1 is a schematic illustration of an SBS laser system 100, according to one embodiment. The SBS laser system 100 includes at least one pump laser device 110 operative to emit an input pump light beam at a first pump frequency along an optical pathway 112. As shown in FIG. 1, the input pump light beam can be an input clockwise (CW) pump beam, for example. An intensity modulator (IM) 114 is in optical communication with pump laser device 110 along optical pathway 112. The intensity modulator 114 is operative to modulate an intensity of the input pump light beam, and to output an intensity modulated pump beam, such as an intensity modulated CW pump beam. An input optical coupler 116 is in optical communication with intensity modulator 114 and is configured to receive the intensity modulated pump beam output from intensity modulator 114. The input optical coupler 116 can be a waveguide or an optical fiber, for example.

An optical resonator 120, such as a circular cavity, is optically coupled to input optical coupler 116. The optical resonator 120 is configured to receive the intensity modulated pump beam from input optical coupler 116 such that the intensity modulated pump beam (CW pump beam) travels in a first direction in optical resonator 120, such as a CW direction. When a frequency of the intensity modulated pump beam matches a resonance frequency of optical resonator 120, an optical power density within optical resonator 120 increases such that beyond a certain threshold power, the intensity modulated pump beam produces lasing of a first order Brillouin wave (SBS wave), having an SBS gain peak. The SBS wave travels in an opposite second direction in optical resonator 120, such as a counter-clockwise (CCW) direction. The optical resonator 120 can be a waveguide or an optical fiber, for example.

An output optical coupler 130 is optically coupled to optical resonator 120. The output optical coupler 130 is configured to receive and output the intensity modulated pump beam from optical resonator 120 in the first direction (e.g., output CW pump). The output optical coupler 130 is also configured to receive and output the first order Brillouin wave from optical resonator 120 in the opposite second direction (e.g., output CCW SBS). The output optical coupler 130 can be a waveguide or an optical fiber, for example.

A control unit 140 is operatively coupled to output optical coupler 130. The control unit 140 is configured to receive an input signal corresponding to the intensity modulated pump beam. The control unit 140 is operative to eliminate or reduce the intensity modulation of the pump beam by minimizing the frequency gap between the SBS gain peak and a SBS resonance peak. This can be done by adjustment of the pump laser frequency through a laser locking offset technique, or by temperature tuning of optical resonator 120. Example embodiments that provide further details of these control techniques are described hereafter.

The intensity modulated input pump ($I_P$) beam such as the input CW pump can be represented by the following equation:

$$I_P = I_{P0} + amp * \cos(2\pi f t) \quad (1)$$

where IP0 is the nominal pump intensity; amp is the modulation amplitude; f is the modulation frequency; and t is the time.

The intensity modulated output pump beam ($I_{Pump,output}$) such as the output CW pump, can be represented by the following equation:

$$I_{Pump,output} = Z * \left(1 + \left(2 \frac{(\Delta v_1)/\Delta v_B}{1 + \frac{\Delta v_c}{\Delta v_B}\left(2 - \sqrt{\frac{IP0}{IPth} + \frac{amp * \cos[2\pi * f * t]}{IPth}}\right)}\right)^2\right) \quad (2)$$

where Z is the pump output without gain pulling; $\Delta v_1$ is the separation between the gain peak and the SBS resonance peak; $\Delta v_B$ is the SBS gain bandwidth; IPth is the pump threshold without gain pulling; IP0 is the nominal pump intensity; amp is the modulation amplitude; f is the modulation frequency; t is the time; and $\Delta v_c$ is the cold cavity linewidth. When $\Delta v_1 = 0$, then the 1$^{st}$ harmonic term of $I_{Pump,output}$ approaches zero.

In one exemplary technique, the pump laser frequency ($f_P$) can be shifted to make $\Delta v_1 = 0$. In another technique, the resonator temperature can be tuned to make $\Delta v_1 = 0$. The SBS frequency shift ($f_{sbs\_shift}$) can be determined by the speed of the sound in the material, and generally has a temperature sensitivity of about −1.5 MHz/° C. Therefore, by adjusting the resonator temperature, the $f_{sbs\_shift}$ can be changed to make $\Delta v_1 = 0$.

While temperature tuning changes the SBS frequency shift, such tuning is also reciprocal for the CW and CCW directions. It is possible to reach $\Delta v_1 = 0$ in both CW and CCW directions by tuning the temperature of the resonator while there is no frequency shift between CW and CCW.

Under rotation, however, the CW and CCW resonance frequencies are separated. Because the Sagnac effect is a non-reciprocal effect, the reciprocal method (temperature tuning) cannot make $\Delta v_1 = 0$ for both CW and CCW directions simultaneously. Therefore, the CW and CCW pump laser frequencies need to be tuned separately to obtain $\Delta v_1 = 0$ for both CW and CCW directions simultaneously.

Figure 2:
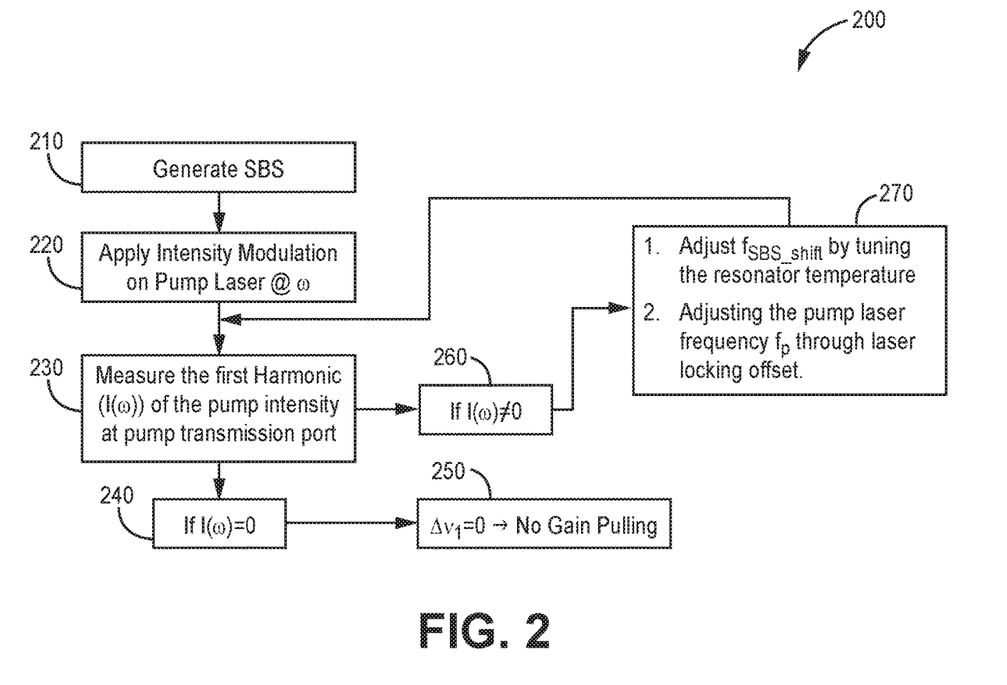
FIG. 2 is a flow diagram of a method for reducing frequency or gain pulling in an SBS laser, according to an exemplary implementation.

FIG. 2 is a flow diagram 200 depicting a method for reducing frequency or gain pulling in an SBS laser, according to an exemplary implementation. Initially, method 200 generates an SBS wave (block 210), such as with a pump laser coupled to a resonator. The method 200 then applies an intensity modulation on the pump laser at a given frequency (ω) (block 220). The method 200 monitors for gain pulling by measuring the first harmonic (I(ω)) of the pump intensity at a pump transmission port (block 230). If the first harmonic is equal to zero ($\Delta v_1 = 0$) (block 240), then the separation between the gain peak and the SBS resonance peak is zero ($\Delta v_1 = 0$) and there is no gain pulling (block 250). If the first harmonic (I(ω)) is not equal to zero (I(ω)≠0) (block 260) control techniques are applied to adjust the SBS frequency shift ($f_{SBS\_shift}$) by tuning the resonator temperature, or to adjust the pump laser frequency ($f_P$) through a laser locking offset (block 270). The method 200 then returns to block 230 to continue monitoring for gain pulling.

Figure 3:
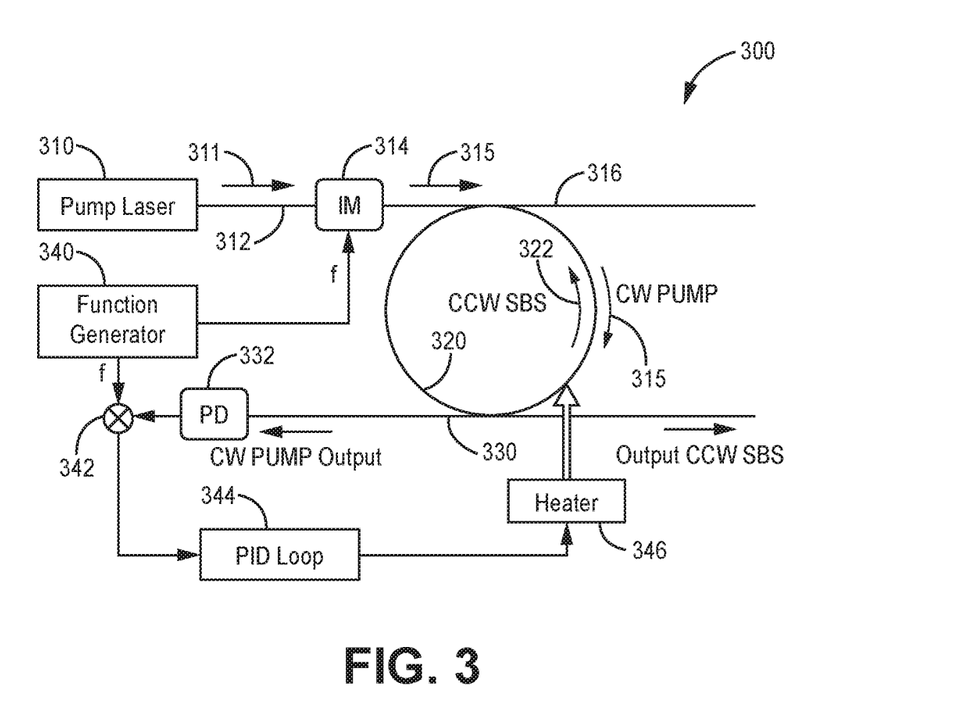
FIG. 3 is a schematic illustration of an SBS laser system, according to another embodiment.

FIG. 3 is a schematic illustration of an SBS laser system 300, according to another embodiment. The SBS laser system 300 includes at least one pump laser device 310 operative to emit an input pump light beam 311 at a first pump frequency along an optical pathway 312. An intensity modulator (IM) 314 is in optical communication with pump laser device 310 along optical pathway 312. The intensity modulator 314 is operative to modulate an intensity of input pump light beam 311, and to output an intensity modulated CW pump beam 315. An input optical coupler 316 is in optical communication with intensity modulator 314 and is configured to receive intensity modulated CW pump beam 315 output from intensity modulator 314.

An optical resonator 320 is optically coupled to input optical coupler 316. The optical resonator 320 is configured to receive intensity modulated CW pump beam 315 from input optical coupler 316 such that intensity modulated CW pump beam 315 travels in a CW direction around optical resonator 320. When a frequency of intensity modulated CW pump beam 315 matches a resonance frequency of optical resonator 320, an optical power density within optical resonator 320 increases such that beyond a certain threshold power, intensity modulated CW pump beam 315 produces lasing of a first order Brillouin wave, such as an SBS wave 322 having an SBS gain peak. The SBS wave 322 travels in a CCW direction in optical resonator 320.

An output optical coupler 330 is optically coupled to optical resonator 320. The output optical coupler 330 is configured to receive and output intensity modulated CW pump beam 315 (CW pump output) from optical resonator 320 in a first direction. The output optical coupler 330 is also configured to receive and output SBS wave 322 (output CCW SBS) from optical resonator 320 in an opposite second direction.

The SBS laser system 300 also comprises a control section, which includes a photodetector (PD) 332 in optical communication with optical resonator 320 through output optical coupler 330. The photodetector 332 converts the CW pump output to a corresponding electrical signal. A function generator 340 is operative to drive intensity modulator 314 at a modulation frequency (f). The function generator 340 is operative to send the modulation frequency to intensity modulator 314 to adjust the intensity modulation. A mixer 342 is operative to receive the modulation frequency from function generator 340 and the electrical signal from photodetector 332. A proportional-integral-derivative (PID) loop controller 344 is operative to receive an output signal from mixer 342. A heater 346 is configured to receive a control signal from PID loop controller 344, with heater 346 being in thermal communication with optical resonator 320. The heater 346 is responsive to the control signal from PID loop controller 344 to provide temperature tuning of optical resonator 320, such as adjustment of a first temperature to a second temperature in optical resonator 320. The temperature adjustment is operative such that a frequency gap is eliminated or reduced between the SBS gain peak and an SBS resonance peak.

Figure 4:
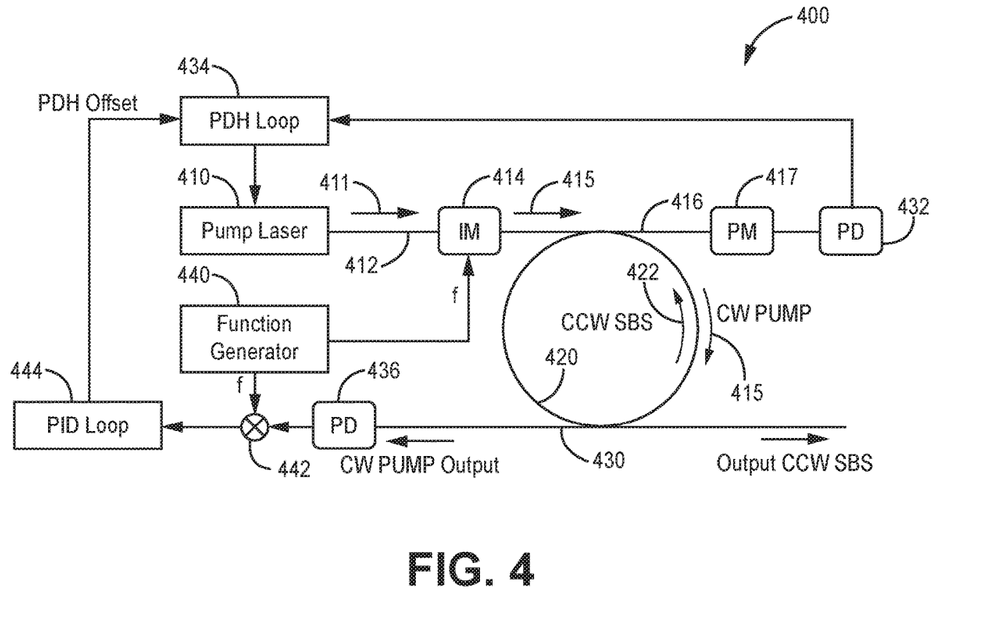
FIG. 4 is a schematic illustration of an SBS laser system, according to an alternative embodiment.

FIG. 4 is a schematic illustration of an SBS laser system 400, according to an alternative embodiment. The SBS laser system 400 includes at least one pump laser device 410 operative to emit an input pump light beam 411 at a first pump frequency along an optical pathway 412. An intensity modulator (IM) 414 is in optical communication with pump laser device 410 along optical pathway 412. The intensity modulator 414 is operative to modulate an intensity of input pump light beam 411, and to output an intensity modulated CW pump beam 415. An input optical coupler 416 is in optical communication with intensity modulator 414 and is configured to receive intensity modulated CW pump beam 415 output from intensity modulator 414.

An optical resonator 420 is optically coupled to input optical coupler 416. The optical resonator 420 is configured to receive intensity modulated CW pump beam 415 from input optical coupler 416 such that intensity modulated CW pump beam 415 travels in a CW direction around optical resonator 420. When a frequency of intensity modulated CW pump beam 415 matches a resonance frequency of optical resonator 420, an optical power density within optical resonator 420 increases such that beyond a certain threshold power, intensity modulated CW pump beam 415 produces lasing of a first order Brillouin wave, such as an SBS wave 422 having an SBS gain peak. The SBS wave 422 travels in a CCW direction in optical resonator 420.

An output optical coupler 430 is optically coupled to optical resonator 420. The output optical coupler 430 is configured to receive and output intensity modulated CW pump beam 415 (CW pump output) from optical resonator 420 in a first direction. The output optical coupler 430 is also configured to receive and output SBS wave 422 (output CCW SBS) from optical resonator 420 in an opposite second direction.

The SBS laser system 400 also comprises a control section, which includes a first photodetector 432 in optical communication with intensity modulator 414 through input optical coupler 416. A portion of intensity modulated CW pump beam 415 is transmitted to first photodetector 432 through an intensity phase modulator 417, which is used to provide high frequency phase modulation that can be used for Pound-Drever-Hall (PDH) locking. The first photodetector 432 converts this portion of phase modulated CW pump beam 415 to a corresponding first electrical signal. A PDH loop 434 is operative to receive the first electrical signal from first photodetector 432. A second photodetector 436 is in optical communication with optical resonator 420 through output optical coupler 430. The second photodetector 436 converts the CW pump output to a corresponding second electrical signal. A function generator 440 is operative to send a modulation frequency (f) to intensity modulator 414 to adjust the intensity modulation. A mixer 442 is operative to receive the modulation frequency from function generator 440 and the second electrical signal from second photodetector 436.

A PID loop controller 444 is operative to receive an output signal from mixer 442. The PID loop controller 444 generates a PDH offset signal, which is sent to PDH loop 434. An output signal from PDH loop 434 is sent to pump laser device 410 to provide an adjustment of the pump laser frequency through a laser locking offset. The adjustment of the pump laser frequency is operative such that a frequency gap is eliminated or reduced between the SBS gain peak and an SBS resonance peak.

Figure 5:
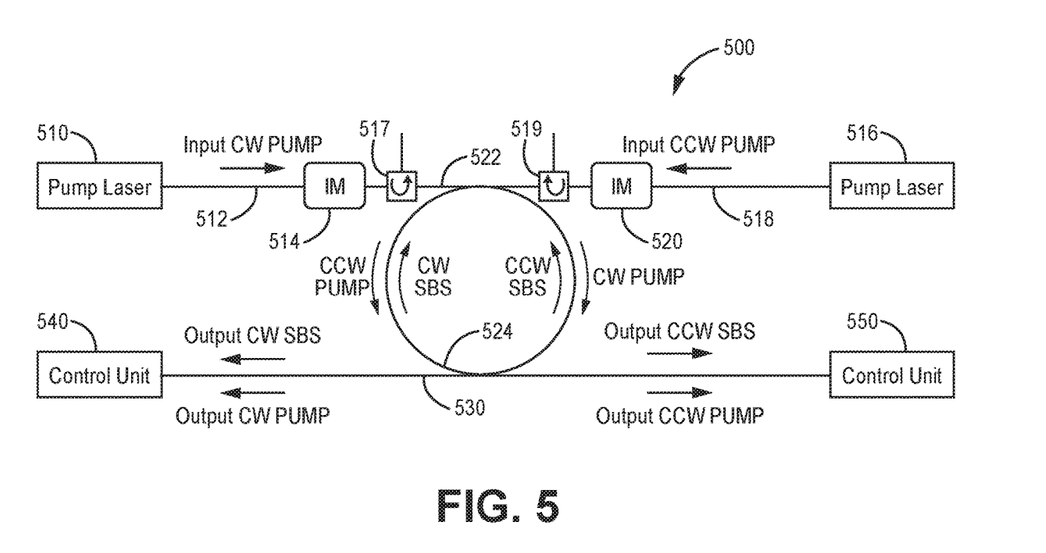
FIG. 5 is a schematic illustration of an SBS laser system, according to another embodiment, which can be implemented as part of an SBS laser gyroscope.

FIG. 5 is a schematic illustration of an SBS laser system 500, according to another embodiment, which can be implemented as part of an SBS laser gyroscope. The SBS laser system 500 includes a first pump laser device 510 operative to emit an input CW pump beam at a first pump frequency along a first optical pathway 512. A first intensity modulator 514 is in optical communication with pump laser device 510 along first optical pathway 512. A first optical circulator 517 is placed after intensity modulator 514 along first optical pathway 512 before an input optical coupler 522.

A second pump laser device 516 is operative to emit an input CCW pump beam at a second pump frequency along a second optical pathway 518. A second intensity modulator 520 is in optical communication with pump laser device 516 along second optical pathway 518. A second optical circulator 519 is placed after second intensity modulator 520 along second optical pathway 518 before input optical coupler 522.

The input optical coupler 522 is in optical communication with first and second optical circulators 517 and 519. The input optical coupler 522 is configured to receive an intensity modulated CW pump beam output from optical circulator 517, and an intensity modulated CCW pump beam output from optical circulator 519.

An optical resonator 524 is optically coupled to input optical coupler 522. The optical resonator 524 is configured to receive the intensity modulated CW pump beam from input optical coupler 522 such that the CW pump beam travels in a CW direction in optical resonator 524. The ratio of input optical coupler 522 is designed to meet the input impedance match condition, which ensures that all the input beams are coupled into optical resonator 524 through input optical coupler 522. The optical resonator 524 is also configured to receive the intensity modulated CCW pump beam from input optical coupler 522 such that the CCW pump beam travels in a CCW direction in optical resonator 524.

When the optical frequency of the CW pump beam matches a resonance frequency of optical resonator 524, an optical power density within optical resonator 524 increases such that beyond a certain threshold power, the CW pump beam produces a first SBS gain spectrum and eventually generates a first SBS laser, with lasing of a first order Brillouin wave including a CCW SBS wave having a first SBS gain peak. The CCW SBS wave travels in a CCW direction in optical resonator 524.

Likewise, when the optical frequency of the CCW pump beam matches a resonance frequency of optical resonator 524, an optical power density within optical resonator 524 increases such that beyond a certain threshold power, the CCW pump beam produces a second SBS gain spectrum and eventually generates a second SBS laser, with lasing of a first order Brillouin wave including a CW SBS wave having a second SBS gain peak. The CW SBS wave travels in a CW direction in optical resonator 524.

An output optical coupler 530 is optically coupled to optical resonator 524. The output optical coupler 530 is configured to receive and output the CW pump beam and the CW SBS wave from optical resonator 524 in a first direction. The output optical coupler 530 is also configured to receive and output the CCW pump beam and the CCW SBS wave from optical resonator 524 in an opposite second direction.

A first control unit 540 is in optical communication with output optical coupler 530 along the first direction, and is configured to receive an output signal corresponding to the transmitted CW pump beam. The first control unit 540 is operative to eliminate or reduce a frequency gap between the first SBS gain peak and a SBS resonance peak.

A second control unit 550 is in optical communication with output optical coupler 530 along the opposite section direction, as is configured to receive an output signal corresponding to the transmitted CCW pump beam. The second control unit 550 operative to eliminate or reduce a frequency gap between the second SBS gain peak and the SBS resonance peak.

Various control techniques can be used by the first and second control units 540, 550, such as those described in previous embodiments, to reduce or eliminate frequency/gain pulling in the SBS laser gyroscope.

EXAMPLE EMBODIMENTS

Example 1 includes a stimulated Brillouin scattering (SBS) laser system, comprising: at least one pump laser device operative to emit a pump light beam at a first pump frequency along an optical pathway; an intensity modulator in optical communication with the at least one pump laser device along the optical pathway, the intensity modulator operative to modulate an intensity of the pump light beam and transmit an intensity modulated pump beam; an optical resonator in optical communication with the intensity modulator, the optical resonator configured to receive the intensity modulated pump beam such that the intensity modulated pump beam travels in a first direction in the optical resonator, wherein when an optical frequency of the intensity modulated pump beam matches a resonance frequency of the optical resonator, an optical power density within the optical resonator increases such that beyond a certain threshold power, the intensity modulated pump beam produces lasing of a first order Brillouin wave including a SBS wave having a SBS gain peak, wherein the SBS wave travels in an opposite second direction in the optical resonator; and a control unit in optical communication with the optical resonator, the control unit configured to receive an output signal corresponding to the transmitted intensity modulated pump beam, the control unit operative to eliminate or reduce the intensity modulation of the pump beam by minimizing the frequency gap between the SBS gain peak and an SBS resonance peak.

Example 2 includes the SBS laser system of Example 1, further comprising: an input optical coupler optically coupled between the intensity modulator and the optical resonator, the input optical coupler configured to receive the intensity modulated pump beam from the intensity modulator and couple the intensity modulated pump beam into the optical resonator; and an output optical coupler optically coupled between the optical resonator and the control unit, the output optical coupler configured to: receive and output the intensity modulated pump beam from the optical resonator in the first direction; and receive and output the SBS wave from the optical resonator in the opposite second direction.

Example 3 includes the SBS laser system of Example 2, wherein the input optical coupler comprises a waveguide or an optical fiber.

Example 4 includes the SBS laser system of any of Examples 2-3, wherein the output optical coupler comprises a waveguide or an optical fiber.

Example 5 includes the SBS laser system of any of Examples 1-4, wherein the optical resonator comprises a waveguide or an optical fiber.

Example 6 includes the SBS laser system of any of Examples 1-5, wherein the frequency gap is eliminated or reduced between the SBS gain peak and the SBS resonance peak by a technique that includes adjustment of a first temperature to a second temperature in the optical resonator.

Example 7 includes the SBS laser system of any of Examples 1-5, wherein the frequency gap is eliminated or reduced between the SBS gain peak and the SBS resonance peak by a technique that includes adjustment of the first pump frequency to a second pump frequency through a laser locking offset.

Example 8 includes the SBS laser system of any of Examples 1-7, wherein the intensity modulated pump beam travels in a clockwise direction in the optical resonator, and the SBS wave travels in a counterclockwise direction in the optical resonator.

Example 9 includes the SBS laser system of any of Examples 1-7, wherein the intensity modulated pump beam travels in a counterclockwise direction in the optical resonator, and the SBS wave travels in a clockwise direction in the optical resonator.

Example 10 includes the SBS laser system of any of Examples 1-9, wherein the control unit comprises: a photodetector in optical communication with the optical resonator through an output optical coupler, the photodetector configured to convert an output signal corresponding to the intensity modulated pump beam to a corresponding electrical signal; a function generator operative to drive the intensity modulator at a modulation frequency; a mixer operative to receive the modulation frequency from the function generator and the electrical signal from the photodetector; a proportional-integral-derivative (PID) loop controller operative to receive an output signal from the mixer; and a heater configured to receive a control signal from the PID loop controller, the heater in thermal communication with the optical resonator; wherein the heater is responsive to the control signal from the PID loop controller to provide temperature tuning of the optical resonator, such that the frequency gap is eliminated or reduced between the SBS gain peak and the SBS resonance peak.

Example 11 includes the SBS laser system of any of Examples 1-9 wherein the control unit comprises: a first photodetector in optical communication with an intensity phase modulator through an input optical coupler that is optically coupled to the intensity modulator and the optical resonator, wherein a reflected portion of the pump beam is transmitted to the first photodetector through the intensity phase modulator, the first photodetector configured to convert the phase modulated portion of the pump beam to a corresponding first electrical signal; a Pound-Drever-Hall (PDH) loop operative to receive the first electrical signal from the first photodetector; a second photodetector in optical communication with the optical resonator through an output optical coupler, the second photodetector configured to convert an output signal corresponding to the intensity modulated pump beam to a corresponding second electrical signal; a function generator operative to drive the intensity modulator at a modulation frequency; a mixer operative to receive the modulation frequency from the function generator and the second electrical signal from the second photodetector; and a proportional-integral-derivative (ND) loop controller operative to receive an output signal from the mixer and generate a PDH offset signal, wherein the PID loop controller sends the PDH offset signal to the PDH loop; wherein an output signal from the PDH loop is sent to the at least one pump laser device to provide adjustment of the first pump frequency to a second pump frequency through a laser locking offset, such that the frequency gap is eliminated or reduced between the SBS gain peak and the SBS resonance peak.

Example 12 includes the SBS laser system of any of Examples 1-11, wherein the SBS layer system is implemented in an SBS laser gyroscope.

Example 13 includes a method for reducing gain pulling in a stimulated Brillouin scattering (SBS) laser, the method comprising: generating at least one SBS wave from a pump light beam emitted by a pump laser coupled to an optical resonator; applying an intensity modulation to the pump light beam at a given wavelength; monitoring for gain pulling by measuring a first harmonic of a pump intensity at a pump transmission port; if the first harmonic is equal to zero, then a separation between a gain peak and an SBS resonance peak is zero, and there is no gain pulling; if the first harmonic is not equal to zero, applying a control technique comprising: adjusting a SBS frequency shift by tuning a temperature of the optical resonator; or adjusting a frequency of the pump laser through a laser locking offset.

Example 14 includes the method of Example 13, wherein the SBS laser is implemented in an SBS laser gyroscope.

Example 15 includes a stimulated Brillouin scattering (SBS) laser gyroscope, comprising: a first pump laser device operative to emit an input clockwise (CW) pump beam at a first pump frequency along a first optical pathway; a first intensity modulator in optical communication with the first pump laser device along the first optical pathway, the first intensity modulator operative to modulate an intensity of the input CW pump beam and output an intensity modulated CW pump beam; a second pump laser device operative to emit an input counterclockwise (CCW) pump beam at a second pump frequency along a second optical pathway; a second intensity modulator in optical communication with the second pump laser device along the second optical pathway, the second intensity modulator operative to modulate an intensity of the input CCW pump beam and output an intensity modulated CCW pump beam; an input optical coupler in optical communication with the first and second intensity modulators and configured to receive the intensity modulated CW and CCW pump beams output from the first and second intensity modulators; an optical resonator optically coupled to the input optical coupler, the optical resonator configured to receive the intensity modulated CW pump beam from the input optical coupler such that the intensity modulated CW pump beam travels in a CW direction in the optical resonator; and receive the intensity modulated CCW pump beam from the input optical coupler such that the intensity modulated CCW pump beam travels in a CCW direction in the optical resonator; wherein when an optical frequency of the intensity modulated CW pump beam matches a resonance frequency of the optical resonator, an optical power density within the optical resonator increases such that beyond a certain threshold power, the intensity modulated CW pump beam produces a first SBS gain spectrum and eventually generates a first SBS laser, wherein a first SBS wave travels in a CCW direction in the optical resonator; wherein when an optical frequency of the intensity modulated CCW pump beam matches the resonance frequency of the optical resonator, an optical power density within the optical resonator increases such that beyond a certain threshold power, the intensity modulated CCW pump beam produces a second SBS gain spectrum and eventually generates a second SBS laser, wherein a second SBS wave travels in a CW direction in the optical resonator; an output optical coupler optically coupled to the optical resonator, the output optical coupler configured to receive and output the intensity modulated CW pump beam and the second SBS wave from the optical resonator in a first direction; receive and output the intensity modulated CCW pump beam and the first SBS wave from the optical resonator in an opposite second direction; a first control unit in optical communication with the output optical coupler, the first control unit configured to receive an output signal corresponding to the intensity modulated CW pump beam, the first control unit operative to eliminate or reduce a frequency gap between the second SBS gain peak and a SBS resonance peak; and a second control unit in optical communication with the output optical coupler, the second control unit configured to receive an output signal corresponding to the intensity modulated CCW pump beam, the second control unit operative to eliminate or reduce a frequency gap between the first SBS gain peak and the SBS resonance peak.

Example 16 includes the SBS laser gyroscope of Example 15, wherein the first control unit is operative such that the frequency gap is eliminated or reduced between the second first gain peak and the SBS resonance peak by a technique that includes: temperature tuning of the optical resonator; or adjustment of the first pump frequency of the first pump laser device through a laser locking offset.

Example 17 includes the SBS laser gyroscope of any of Examples 15-16, wherein the second control unit is operative such that the frequency gap is eliminated or reduced between the second SBS gain peak and the SBS resonance peak by a technique that includes: temperature tuning of the optical resonator; or adjustment of the second pump frequency of the second pump laser device through a laser locking offset.

Example 18 includes the SBS laser gyroscope of any of Examples 15-17, wherein: the input optical coupler comprises a waveguide or an optical fiber; and the output optical coupler comprises a waveguide or an optical fiber.

Example 19 includes the SBS laser gyroscope of any of Examples 15-18, wherein the optical resonator comprises a waveguide or an optical fiber.

Example 20 includes the SBS laser gyroscope of any of Examples 15-19, further comprising: a first optical circulator located after the first intensity modulator along the first optical pathway; and a second optical circulator located after the second intensity modulator along the second optical pathway; wherein the input optical coupler is in optical communication with the first and second optical circulators.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A stimulated Brillouin scattering (SBS) laser system, comprising:
    at least one pump laser device operative to emit a pump light beam at a first pump frequency along an optical pathway;
    an intensity modulator in optical communication with the at least one pump laser device along the optical pathway, the intensity modulator operative to modulate an intensity of the pump light beam and transmit an intensity modulated pump beam;
    an optical resonator in optical communication with the intensity modulator, the optical resonator configured to receive the intensity modulated pump beam such that the intensity modulated pump beam travels in a first direction in the optical resonator, wherein when an optical frequency of the intensity modulated pump beam matches a resonance frequency of the optical resonator, an optical power density within the optical resonator increases such that beyond a certain threshold power, the intensity modulated pump beam produces lasing of a first order Brillouin wave including a SBS wave having a SBS gain peak, wherein the SBS wave travels in an opposite second direction in the optical resonator; and
    a control unit in optical communication with the optical resonator, the control unit configured to receive an output signal corresponding to the transmitted intensity modulated pump beam, the control unit operative to eliminate or reduce the intensity modulation of the pump beam by minimizing the frequency gap between the SBS gain peak and an SBS resonance peak.

2. The SBS laser system of claim 1, further comprising:
    an input optical coupler optically coupled between the intensity modulator and the optical resonator, the input optical coupler configured to receive the intensity modulated pump beam from the intensity modulator and couple the intensity modulated pump beam into the optical resonator; and
    an output optical coupler optically coupled between the optical resonator and the control unit, the output optical coupler configured to:
        receive and output the intensity modulated pump beam from the optical resonator in the first direction; and
        receive and output the SBS wave from the optical resonator in the opposite second direction.

3. The SBS laser system of claim 2, wherein the input optical coupler comprises a waveguide or an optical fiber.

4. The SBS laser system of claim 2, wherein the output optical coupler comprises a waveguide or an optical fiber.

5. The SBS laser system of claim 1, wherein the optical resonator comprises a waveguide or an optical fiber.

6. The SBS laser system of claim 1, wherein the frequency gap is eliminated or reduced between the SBS gain peak and the SBS resonance peak by a technique that includes adjustment of a first temperature to a second temperature in the optical resonator.

7. The SBS laser system of claim 1, wherein the frequency gap is eliminated or reduced between the SBS gain peak and the SBS resonance peak by a technique that includes adjustment of the first pump frequency to a second pump frequency through a laser locking offset.

8. The SBS laser system of claim 1, wherein the intensity modulated pump beam travels in a clockwise direction in the optical resonator, and the SBS wave travels in a counterclockwise direction in the optical resonator.

9. The SBS laser system of claim 1, wherein the intensity modulated pump beam travels in a counterclockwise direction in the optical resonator, and the SBS wave travels in a clockwise direction in the optical resonator.

10. The SBS laser system of claim 1, wherein the control unit comprises:
    a photodetector in optical communication with the optical resonator through an output optical coupler, the photodetector configured to convert an output signal corresponding to the intensity modulated pump beam to a corresponding electrical signal;
    a function generator operative to drive the intensity modulator at a modulation frequency;
    a mixer operative to receive the modulation frequency from the function generator and the electrical signal from the photodetector;
    a proportional-integral-derivative (PID) loop controller operative to receive an output signal from the mixer; and
    a heater configured to receive a control signal from the PID loop controller, the heater in thermal communication with the optical resonator;
    wherein the heater is responsive to the control signal from the PID loop controller to provide temperature tuning of the optical resonator, such that the frequency gap is eliminated or reduced between the SBS gain peak and the SBS resonance peak.

11. The SBS laser system of claim 1 wherein the control unit comprises:
    a first photodetector in optical communication with an intensity phase modulator through an input optical coupler that is optically coupled to the intensity modulator and the optical resonator, wherein a reflected portion of the pump beam is transmitted to the first photodetector through the intensity phase modulator, the first photodetector configured to convert the phase modulated portion of the pump beam to a corresponding first electrical signal;
    a Pound-Drever-Hall (PDH) loop operative to receive the first electrical signal from the first photodetector;
    a second photodetector in optical communication with the optical resonator through an output optical coupler, the second photodetector configured to convert an output signal corresponding to the intensity modulated pump beam to a corresponding second electrical signal;
    a function generator operative to drive the intensity modulator at a modulation frequency;
    a mixer operative to receive the modulation frequency from the function generator and the second electrical signal from the second photodetector; and
    a proportional-integral-derivative (PID) loop controller operative to receive an output signal from the mixer and generate a PDH offset signal, wherein the PID loop controller sends the PDH offset signal to the PDH loop;

wherein an output signal from the PDH loop is sent to the at least one pump laser device to provide adjustment of the first pump frequency to a second pump frequency through a laser locking offset, such that the frequency gap is eliminated or reduced between the SBS gain peak and the SBS resonance peak.

12. The SBS laser system of claim 1, wherein the SBS layer system is implemented in an SBS laser gyroscope.

13. A method for reducing gain pulling in a stimulated Brillouin scattering (SBS) laser, the method comprising:
generating at least one SBS wave from a pump light beam emitted by a pump laser coupled to an optical resonator;
applying an intensity modulation to the pump light beam at a given wavelength;
monitoring for gain pulling by measuring a first harmonic of a pump intensity at a pump transmission port;
if the first harmonic is equal to zero, then a separation between a gain peak and an SBS resonance peak is zero, and there is no gain pulling;
if the first harmonic is not equal to zero, applying a control technique comprising:
adjusting a SBS frequency shift by tuning a temperature of the optical resonator; or
adjusting a frequency of the pump laser through a laser locking offset.

14. The method of claim 13, wherein the SBS laser is implemented in an SBS laser gyroscope.

15. A stimulated Brillouin scattering (SBS) laser gyroscope, comprising:
a first pump laser device operative to emit an input clockwise (CW) pump beam at a first pump frequency along a first optical pathway;
a first intensity modulator in optical communication with the first pump laser device along the first optical pathway, the first intensity modulator operative to modulate an intensity of the input CW pump beam and output an intensity modulated CW pump beam;
a second pump laser device operative to emit an input counterclockwise (CCW) pump beam at a second pump frequency along a second optical pathway;
a second intensity modulator in optical communication with the second pump laser device along the second optical pathway, the second intensity modulator operative to modulate an intensity of the input CCW pump beam and output an intensity modulated CCW pump beam;
an input optical coupler in optical communication with the first and second intensity modulators and configured to receive the intensity modulated CW and CCW pump beams output from the first and second intensity modulators;
an optical resonator optically coupled to the input optical coupler, the optical resonator configured to:
receive the intensity modulated CW pump beam from the input optical coupler such that the intensity modulated CW pump beam travels in a CW direction in the optical resonator; and
receive the intensity modulated CCW pump beam from the input optical coupler such that the intensity modulated CCW pump beam travels in a CCW direction in the optical resonator;
wherein when an optical frequency of the intensity modulated CW pump beam matches a resonance frequency of the optical resonator, an optical power density within the optical resonator increases such that beyond a certain threshold power, the intensity modulated CW pump beam produces a first SBS gain spectrum and eventually generates a first SBS laser, wherein a first SBS wave travels in a CCW direction in the optical resonator;
wherein when an optical frequency of the intensity modulated CCW pump beam matches the resonance frequency of the optical resonator, an optical power density within the optical resonator increases such that beyond a certain threshold power, the intensity modulated CCW pump beam produces a second SBS gain spectrum and eventually generates a second SBS laser, wherein a second SBS wave travels in a CW direction in the optical resonator;
an output optical coupler optically coupled to the optical resonator, the output optical coupler configured to:
receive and output the intensity modulated CW pump beam and the second SBS wave from the optical resonator in a first direction;
receive and output the intensity modulated CCW pump beam and the first SBS wave from the optical resonator in an opposite second direction;
a first control unit in optical communication with the output optical coupler, the first control unit configured to receive an output signal corresponding to the intensity modulated CW pump beam, the first control unit operative to eliminate or reduce a frequency gap between the second SBS gain peak and a SBS resonance peak; and
a second control unit in optical communication with the output optical coupler, the second control unit configured to receive an output signal corresponding to the intensity modulated CCW pump beam, the second control unit operative to eliminate or reduce a frequency gap between the first SBS gain peak and the SBS resonance peak.

16. The SBS laser gyroscope of claim 15, wherein the first control unit is operative such that the frequency gap is eliminated or reduced between the second first gain peak and the SBS resonance peak by a technique that includes:
temperature tuning of the optical resonator; or
adjustment of the first pump frequency of the first pump laser device through a laser locking offset.

17. The SBS laser gyroscope of claim 15, wherein the second control unit is operative such that the frequency gap is eliminated or reduced between the second SBS gain peak and the SBS resonance peak by a technique that includes:
temperature tuning of the optical resonator; or
adjustment of the second pump frequency of the second pump laser device through a laser locking offset.

18. The SBS laser gyroscope of claim 15, wherein:
the input optical coupler comprises a waveguide or an optical fiber; and
the output optical coupler comprises a waveguide or an optical fiber.

19. The SBS laser gyroscope of claim 15, wherein the optical resonator comprises a waveguide or an optical fiber.

20. The SBS laser gyroscope of claim 15, further comprising:
a first optical circulator located after the first intensity modulator along the first optical pathway; and
a second optical circulator located after the second intensity modulator along the second optical pathway;
wherein the input optical coupler is in optical communication with the first and second optical circulators.

* * * * *